L. WARSTLER & P. F. LOICHOT.
COFFEE GRINDER.
APPLICATION FILED FEB. 14, 1912.

1,027,019.

Patented May 21, 1912.

2 SHEETS—SHEET 1.

Witnesses
J. H. Bishop.
Sylvia Boron.

Inventor
Levi Warstler
Paul F. Loichot.
By Bond + Miller
Attorneys

L. WARSTLER & P. F. LOICHOT.
COFFEE GRINDER.
APPLICATION FILED FEB. 14, 1912.

1,027,019.

Patented May 21, 1912.
2 SHEETS—SHEET 2.

Witnesses
J. H. Bishop.
Sylvia Borow.

Inventors
Levi Warstler and
Paul F. Loichot.
By Bond & Miller
Attorneys

COLUMBIA PLANOGRAPH CO., WASHINGTON, D. C.

UNITED STATES PATENT OFFICE.

LEVI WARSTLER AND PAUL F. LOICHOT, OF LOUISVILLE, OHIO.

COFFEE-GRINDER.

1,027,019.  Specification of Letters Patent.  Patented May 21, 1912.

Application filed February 14, 1912. Serial No. 677,483.

*To all whom it may concern:*

Be it known that we, LEVI WARSTLER and PAUL F. LOICHOT, citizens of the United States, residing at Louisville, in the county of Stark and State of Ohio, have invented new and useful Improvements in Coffee-Grinders, of which the following is a specification.

The present invention has to do with the grinding disks and their specific construction and peculiar dress.

The objects of the invention are, first to provide a pair of grinding disks for coffee mills, which will rapidly grind the coffee berries and second, to so arrange the grinding teeth and drift grooves that the reduction will be rapid and the minimum resistance offered during the grinding process. These objects together with other objects readily apparent to those skilled in the art we attain by the construction illustrated in the accompanying drawings, although our invention may be embodied in a variety of other mechanical forms, the illustration shown being the preferable one.

Figure 1:
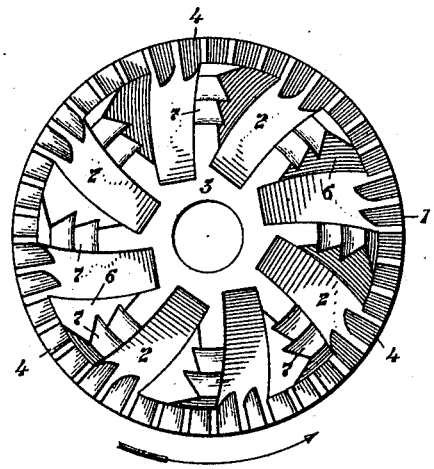
Figure 2:
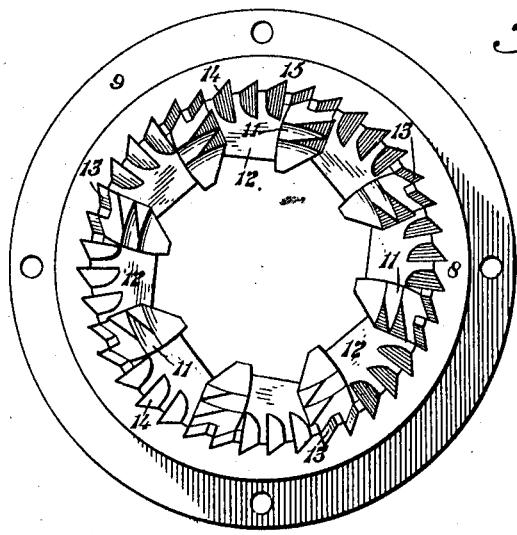
Figure 3:
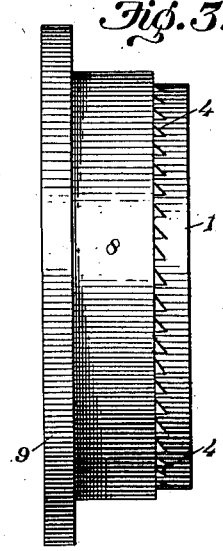
Figure 4:
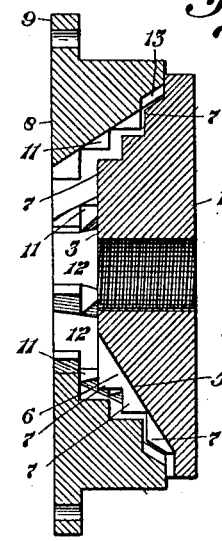
Figure 5:
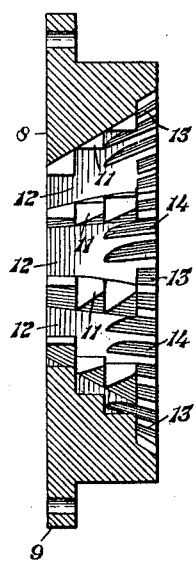
Figure 6:
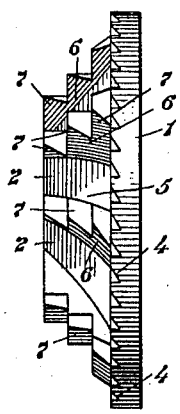

In the accompanying drawings: Figure 1 is a face view of the rotating or running disk. Fig. 2 is a face view of the stationary or fixed disk. Fig. 3 is a side elevation of the two disks shown in proper relationship with reference to each other. Fig. 4 is a diametrical section of the two disks. Fig. 5 is a diametrical section of the fixed disk. Fig. 6 is a side elevation of the rotating or running disk.

Similar numerals of reference indicate corresponding parts in all the figures of the drawings.

In the accompanying drawings 1 represents the rotating or running disk, which disk is mounted upon a rotating shaft such as commonly used in coffee mills and rotated in the usual manner. The disks here shown constituting a part of the coffee mill are more specifically arranged and designed for power mills such as are propelled by electric or water motors. The running disk 1 is provided with a series of drift channels 2, which channels are curved substantially as shown in Fig. 1 and are so curved for the purpose of facilitating the movement of the coffee toward the periphery of said disk 1. The drift grooves 2 extend from the hub or raised portion 3 to the final grinding teeth 4, said grinding teeth 4 being arranged substantially as shown in Fig. 1 and constitute a series of teeth, said series going to make up an entire circle and presenting what might be termed, an integral toothed band located upon the face of the running disk at its periphery.

The running disk 1 has a frustum portion 5, which frustum portion is located between the top or extreme outer face of the hub 3 and the series of the teeth 4. Upon the surface of the frustum 5 are located, a series of spaced flanges 6, which flanges are provided with stepped grinding teeth 7. The forward or grinding portions of said teeth are curved to a radial line, the curvature corresponding with the curvature of the drift grooves 2, and are so curved for the purpose of preventing all of the teeth upon any one flange being brought into grinding action at one and the same time, or in other words the teeth nearer the axis of the running disks will be brought into action slightly in advance of the teeth farthermost away from the axis of the periphery of the grinding disks, in other words the center or inner teeth 7 first act upon the coffee berries and constitute what might be termed the breakers and as the coffee or material designed to be ground passes outward, the material is gradually ground to a certain degree of fineness prior to the time it reaches the pulverizing teeth hereinafter described. The arrangement of the various teeth, or what might be termed a breaker tooth with reference to the running disk and fixed disk are best illustrated in Fig. 4 and as illustrated the space between the teeth between the running disk and fixed disk is lessened by degrees toward the peripheries of the two disks.

The fixed or stationary disk 8 is provided with the attaching flange 9 which attaching flange is for the purpose of providing means for connecting said fixed disk 8 to some fixed part of the coffee mill; but so far as connecting the fixed disk 8 is concerned it is a question of mechanical skill and hence the part of the mill to which the fixed disk is attached is not illustrated. The fixed disk 8 is provided with a recess or chamber of a size and shape to correspond with the size and shape of the frustum portion of the running disk, but the recess or chamber must necessarily be somewhat larger in diameter than the diameter of the frustum portion of the running disk so that the proper spaces will be provided for the various grinding teeth. The fixed disk 8 provided with the chamber into which the frustum portion of the running disk is entered is provided with spaced rows of teeth 11 between which rows of teeth are located channels or grooves 12. The teeth 11 are designed to co-act with the stepped grinding teeth 7 and when the material designed to be ground is fed between the stepped teeth 7 and the teeth 11 it is gradually reduced. The fixed disk is provided with a series of pulverizing teeth 13 which pulverizing teeth are located upon the inner surface of the chamber of said fixed disk at the extreme inner portion thereof and the teeth 14 located at the outer ends of the channels 12 are formed longer than the teeth 11 so that said teeth will be extended into the channels 12. This set of pulverizing teeth made up of the teeth 13 and 14 constitute the pulverizing teeth upon the fixed disk 8 and the teeth 4 upon the running disk constitute the final pulverizing teeth. That is to say the coffee or material must pass the pulverizing teeth 13 and 14 and then pass out between the two disks, the teeth 4 being located against or near the outer smooth surface or ring portion 15 of the fixed disk 8.

It will be understood that in order to change the degree of fineness of the grinding and pulverizing one of the disks must be be adjustable to or from the other. In the present instance it is preferable to provide means for adjusting the shaft upon which the running disk is mounted. It will be understood that any well known means may be employed for adjusting the grinding disk to or from each other to regulate the degree of fineness as to grinding. The cutting ends of the teeth 11 are curved and are so curved for the purpose of preventing all of the teeth being brought into grinding action with all of the teeth 7 located upon the running disk at one and the same time. The forward ends of the teeth 7 being also curved, the grinding action will be gradual or in other words that fewer berries or grains of coffee will be acted upon at the same instance by reason of which the reduction of coffee or material will be continuous or practically so and not intermittent or in other words some of the teeth will be in full grinding action at all times, but all of the grinding teeth will not be brought into full grinding action at one and the same action.

Having fully described our invention what we claim as new and desire to secure by Letters Patent, is—

1. In a coffee mill, a pair of grinding disks, one a running disk and the other fixed, the running disk provided with a frustum and the fixed disk provided with a chamber adapted to receive the frustum portion of the running disk, said frustum portion of the running disk provided with curved drift grooves, flanges located adjacent the drift grooves, said flanges provided with stepped grinding teeth, the forward ends of said grinding teeth curved to correspond with the curvature of the drift grooves, the fixed disk provided with grinding teeth adapted to intermesh with the teeth upon the running disk and the forward ends of the said teeth curved, substantially as and for the purpose specified.

2. In a coffee mill, a pair of grinding disks, one a running disk and the other fixed, the running disk provided with a frustum and the fixed disk provided with a chamber adapted to receive the frustum portion of the running disk, said frustum portion of the running disk provided with curved drift grooves, flanges located adjacent the drift grooves, said flanges provided with stepped grinding teeth, the forward ends of said grinding teeth curved to correspond with the curvature of the drift grooves, the fixed disk provided with grinding teeth adapted to intermesh with the teeth upon the running disk and the forward ends of the said teeth curved, and pulverizing teeth located near the peripheries of the disk, substantially as and for the purpose specified.

3. In a coffee mill, a pair of grinding disks, one a running disk and the other fixed, the running disk provided upon its grinding face with a series of curved drift grooves, teeth located back of the drift grooves and adjacent thereto, the forward ends of said teeth curved to correspond with the curvature of the drift grooves, the fixed disk provided with channels upon its grinding face, a series of teeth located adjacent the channels, their forward ends curved, a concentric row of pulverizing teeth, some of said pulverizing teeth extending into said channels, said fixed disk provided with a smooth portion adjacent the pulverizing teeth, said smooth portion located upon the face of the fixed disk and the running disk provided with a series of pulverizing teeth adapted to be located adjacent the smooth portion of the fixed disk, substantially as and for the purpose specified.

4. In a coffee mill, a pair of grinding disks, one a running disk and the other fixed, the running disk provided upon its grinding face with a series of curved drift grooves, teeth located back of the drift grooves and adjacent thereto, the forward ends of said teeth curved to correspond with the curvature of the drift grooves, the fixed disk provided with channels upon its grinding face, a series of teeth located adjacent the channels, a concentric row of pulverizing teeth, said fixed disk provided with a smooth portion adjacent the pulverizing teeth, said non-toothed portion located upon the face of the fixed disk and the running disk provided with a series of pulverizing teeth located adjacent the smooth portion of the fixed disk, substantially as and for the purpose specified.

In testimony that we claim the above, we have hereunto subscribed our names in the presence of two witnesses.

LEVI WARSTLER.
PAUL F. LOICHOT.

Witnesses:
JOHN H. BISHOP,
F. W. BOND.

Copies of this patent may be obtained for five cents each, by addressing the "Commissioner of Patents, Washington, D. C."